(12) United States Patent
Mukherjee et al.

(10) Patent No.: US 11,562,355 B2
(45) Date of Patent: Jan. 24, 2023

(54) METHOD, SYSTEM, AND COMPUTER PROGRAM PRODUCT FOR AUTOMATICALLY RE-PROCESSING A TRANSACTION

(71) Applicant: Visa International Service Association, San Francisco, CA (US)

(72) Inventors: Anindya Mukherjee, Kloten (CH); Robert Michael Yost, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/263,303

(22) Filed: Jan. 31, 2019

(65) Prior Publication Data

US 2020/0250668 A1    Aug. 6, 2020

(51) Int. Cl.
*G06Q 20/00* (2012.01)
*G06Q 20/40* (2012.01)
*G06Q 20/22* (2012.01)

(52) U.S. Cl.
CPC .......... *G06Q 20/40* (2013.01); *G06Q 20/227* (2013.01)

(58) Field of Classification Search
USPC ......................................................... 705/44
See application file for complete search history.

(56) References Cited

U.S. PATENT DOCUMENTS

| | | | |
|---|---|---|---|
| 8,577,803 B2 | 11/2013 | Chatterjee et al. | |
| 8,626,655 B2 | 1/2014 | Akella et al. | |
| 2001/0039535 A1 | 11/2001 | Tsiounis et al. | |
| 2002/0026395 A1 | 2/2002 | Peterson | |

(Continued)

FOREIGN PATENT DOCUMENTS

| | | |
|---|---|---|
| KR | 20020006189 A | 1/2002 |
| KR | 1020090004833 A | 1/2009 |

(Continued)

OTHER PUBLICATIONS

Authors: Yukun Zhou et al: Implementation of Cryptographic Algorithm in Dynamic QR Code Payment System and Its Performance; Published in: IEEE Access (vol. 9); pp. 122362-122372; Date of Publication: Aug. 26, 2021; (Year: 2021).*

(Continued)

*Primary Examiner* — Bruce I Ebersman
*Assistant Examiner* — Hatem M Ali
(74) *Attorney, Agent, or Firm* — The Webb Law Firm

(57) ABSTRACT

A method for automatically re-processing a transaction in an electronic payment processing network independent of a merchant system or a user includes: receiving a first transaction message associated with a payment transaction; generating a first authorization request; communicating the first authorization request to an issuer system; in response to determining that the first authorization request failed, automatically determining a second payment device associated with the user based on profile data; automatically generating a second authorization request associated with the transaction; communicating the second authorization request to a second issuer system; and in response to determining that the second authorization request was approved by the second issuer, processing the transaction based on the transaction data and the second account data.

14 Claims, 5 Drawing Sheets

(56) References Cited

U.S. PATENT DOCUMENTS

| | | |
|---|---|---|
| 2002/0062249 A1 | 5/2002 | Iannacci |
| 2002/0065839 A1 | 5/2002 | McCulloch |
| 2002/0082920 A1 | 6/2002 | Austin et al. |
| 2003/0126075 A1 | 7/2003 | Mascavage et al. |
| 2003/0126094 A1 | 7/2003 | Fisher et al. |
| 2003/0182204 A1 | 9/2003 | Rhee |
| 2005/0283279 A1 | 12/2005 | Cleeves et al. |
| 2006/0131390 A1 | 6/2006 | Kim |
| 2006/0212407 A1 | 9/2006 | Lyon |
| 2006/0237528 A1 | 10/2006 | Bishop et al. |
| 2006/0258397 A1 | 11/2006 | Kaplan et al. |
| 2006/0259390 A1 | 11/2006 | Rosenberger |
| 2007/0106558 A1 | 5/2007 | Mitchell et al. |
| 2007/0125840 A1 | 6/2007 | Law et al. |
| 2007/0150566 A1 | 6/2007 | Lamparello et al. |
| 2008/0133351 A1 | 6/2008 | White et al. |
| 2008/0154704 A1 | 6/2008 | Flake et al. |
| 2009/0090783 A1 | 4/2009 | Killian et al. |
| 2009/0099961 A1 | 4/2009 | Ogilvy |
| 2009/0254944 A1 | 10/2009 | Watson et al. |
| 2009/0265249 A1* | 10/2009 | Bishop ............... G06Q 20/202 705/21 |
| 2009/0271262 A1 | 10/2009 | Hammad |
| 2010/0174562 A1 | 7/2010 | Siepser |
| 2010/0257066 A1 | 10/2010 | Jones et al. |
| 2010/0262537 A1 | 10/2010 | Park |
| 2010/0299217 A1 | 11/2010 | Hui |
| 2010/0306015 A1 | 12/2010 | Kingston |
| 2010/0332265 A1 | 12/2010 | Smith |
| 2011/0166922 A1 | 7/2011 | Fuerstenberg |
| 2011/0191149 A1 | 8/2011 | Blackhurst et al. |
| 2011/0251892 A1 | 10/2011 | Laracey |
| 2012/0239477 A1 | 9/2012 | Cueli et al. |
| 2013/0024289 A1 | 1/2013 | Cueli et al. |
| 2014/0136353 A1 | 5/2014 | Goldman et al. |
| 2015/0120472 A1 | 4/2015 | Aabye et al. |
| 2017/0366530 A1 | 12/2017 | Dominguez et al. |
| 2018/0232720 A1 | 8/2018 | Robeen et al. |
| 2020/0065783 A1* | 2/2020 | Fernandes ............ G06Q 20/20 |

FOREIGN PATENT DOCUMENTS

| | | | |
|---|---|---|---|
| KR | 1020090099853 A | | 9/2009 |
| KR | 1020090122321 A | | 11/2009 |
| KR | 1020100036468 A | | 4/2010 |
| WO | 0165440 A1 | | 9/2001 |
| WO | 2004012036 A2 | | 2/2004 |
| WO | 2011127177 A2 | | 10/2011 |
| WO | WO-2022022820 A1 | * | 2/2022 |

OTHER PUBLICATIONS

Authors: Divya Goel et al: Reactive Microservices in Commodity Resources; Published in: 2019 IEEE International Conference on Big Data (Big Data); Date Added to IEEE Xplore: Feb. 24, 2020; (Year: 2020).*
1.Authors: Yukun Zhou et al: Implementation of Cryptographic Algorithm in Dynamic QR Code Payment System and Its Performance; Published in: IEEE Access ( vol. 9); pp. 122362-122372; Date of Publication: Aug. 26, 2021; (Year: 2021) (Year: 2021).*
2. Authors: Divya Goel et al: Reactive Microservices in Commodity Resources; Published in: 2019 IEEE International Conference on Big Data (Big Data); Date Added to IEEE Xplore: Feb. 24, 2020; (Year: 2020) (Year: 2020).*
"Failed Payments and Involuntary Churn—A Definitive Guide", https://www.chargebee.com/resources/guides/involuntary-churn-payment-failed/, 22 pages.
Nambiar et al., "Analysis of Payment Transaction Security in Mobile Commerce", 2004 IEEE, pp. 475-480.
"Transactions | Declines—Braintree Support Articles", https://articles.braintreepayments.com/control-panel/transactions/declines, 20 pages.

* cited by examiner

| Electronic Wallet for John A. Smith | | |
|---|---|---|
| Payment Device | PAN | Authorization Probability |
| Card 1 | 1234567891011221 | 99.5% |
| Card 2 | 9123456789101112 | 99.9% |
| Card 3 | 1234256789101122 | 33.0% |
| Card 4 | 9123456789101113 | 89.7% |

FIG. 2

METHOD, SYSTEM, AND COMPUTER PROGRAM PRODUCT FOR AUTOMATICALLY RE-PROCESSING A TRANSACTION

BACKGROUND

Field

The disclosure relates to automated re-processing of failed transactions and, in non-limiting embodiments or aspects, to methods, systems, and computer program products for automatically re-processing a transaction in an electronic payment processing network independent of a merchant system or a user, the electronic payment processing network comprising a transaction processing system in communication with at least one issuer system and at least one merchant system.

Technical Considerations

Upon a user presenting a payment device, such as a credit card, to a merchant to initiate a transaction, an authorization request is routed to the issuer of the payment device to request authorization of the transaction. In certain situations, and for various reasons, the authorization request is declined, such that the transaction cannot be processed using the presented payment device. To complete the transaction in such cases, the user must either present another payment device, which must be authorized for use by the corresponding issuer or the user must present a sufficient amount of cash to the merchant. Otherwise, the transaction will not continue to completion, resulting in a lost sale.

SUMMARY

Accordingly, and generally, provided is an improved method, system, and computer program product for automatically re-processing a transaction in an electronic payment processing network independent of a merchant system or a user.

According to some non-limiting embodiments or aspects, a computer-implemented method for automatically re-processing a transaction in an electronic payment processing network independent of a merchant system or a user, the electronic payment processing network including a transaction processing system in communication with at least one issuer system and at least one merchant system, the method including: receiving, with the transaction processing system, a first transaction message associated with a payment transaction between a user and a merchant, the first transaction message including transaction data including first account data associated with a first payment device issued to the user; generating, with the transaction processing system, a first authorization request including the first account data; communicating, with the transaction processing system, the first authorization request to an issuer system; in response to determining that the first authorization request failed, automatically determining, with the transaction processing system, a second payment device associated with the user from a plurality of payment devices associated with the user based on profile data associated with the plurality of payment devices; automatically generating, with the transaction processing system, a second authorization request associated with the transaction, the second authorization request including second account data associated with the second payment device issued to the user; communicating, with the transaction processing system, the second authorization request to a second issuer system associated with the second payment device; and in response to determining that the second authorization request was approved by the second issuer, processing, with the transaction processing system, the transaction based on the transaction data and the second account data.

In some non-limiting embodiments or aspects, the first authorization request may include a card-present authorization request, and the second authorization request may include a card-not-present authorization request. Determining the second payment device may include: querying, with the transaction processing system, an electronic wallet provider system; and receiving, from the electronic wallet provider system, a query response identifying the second payment device. The profile data may include at least one of the following: payment device type associated with each payment device, transaction amount of the transaction, daily spend associated with each payment device, monthly spend associated with each payment device, risk level associated with each payment device, approval ratio associated with each payment device, channels and authentication associated with each payment device, ratio of cross-border to domestic transactions associated with each payment device, or any combination thereof. The method may further include: in response to receiving the first transaction message, determining, with the transaction processing system, that the user is registered with an automatic re-processing program, where the second payment device may be automatically determined in response to determining that the user is registered with the automatic re-processing program. The plurality of payment devices associated with the user may be registered with the user in the automatic re-processing program. The first payment device may be issued to the user by a first issuer associated with the issuer system, and the second payment device may be issued to the user by a second issuer associated with the second issuer system, where the first authorization request may be communicated to the issuer system, and the second authorization request, may be communicated to the second issuer system.

In some non-limiting embodiments or aspects, the first authorization request may include a credit card authorization request or a debit card authorization request, and the second authorization request may include a credit card authorization request if the first authorization request includes a debit card authorization request or a debit card authorization request if the first authorization request includes a credit card authorization request. The method may include: in response to receiving the second authorization response, communicating, with the transaction processing system, a first transaction response including at least a portion of the second account data. Automatically generating the second authorization request may include generating the second authorization request independent of the user and the merchant system. Determining the second payment device may include querying, with the transaction processing system, an electronic wallet provider system and receiving a query response identifying the second payment device, where the second payment device is determined to have a highest likelihood of approval of the plurality of payment devices. Determining that the first authorization request failed may include determining that the first authorization request was declined or that no response to the first authorization request was received within a predetermined time period.

In some non-limiting embodiments or aspects, the method may include: in response to determining that the first authorization request failed, automatically determining, with the transaction processing system, the second payment device and a third payment device associated with the user from a plurality of payment devices associated with the user; automatically generating, with the transaction processing system, the second authorization request associated with the transaction, where the second authorization request may include a split authorization request including a second retry and a third retry, where the second retry may include second account data associated with the second payment device issued to the user and the third retry may include third account data associated with the third payment device issued to the user; communicating, with the transaction processing system, the second authorization request to the second issuer system associated with the second payment device and a third issuer system associated with the third payment device; receiving, with the transaction processing system, second authorization responses in response to the second authorization request; determining, with the transaction processing system, that the second authorization request was approved based on the second authorization responses; and in response to determining that the second authorization request was approved, processing, with the transaction processing system, the transaction based on the transaction data, the second account data, and the third account data. The split authorization request may evenly split a transaction amount associated with the payment transaction between the second retry and the third retry. The third payment device may be the same as the first payment device, and where the split authorization request may unevenly split a transaction amount associated with the payment transaction between the second retry and the third retry, where the third retry may include an authorization amount associated with a funds balance of the third payment device, and the second retry may include an authorization amount equal to a difference between the transaction amount and the funds balance of the third payment device.

According to some non-limiting embodiments or aspects, a system for automatically re-processing a transaction in an electronic payment processing network independent of a merchant system or a user, the electronic payment processing network including a transaction processing system in communication with at least one issuer system and at least one merchant system, includes at least one processor of the transaction processing system programmed or configured to: receive a first transaction message associated with a payment transaction between a user and a merchant, the first transaction message including transaction data including first account data associated with a first payment device issued to the user; generate a first authorization request including the first account data; communicate the first authorization request to an issuer system; in response to determining that the first authorization request failed, automatically determine a second payment device associated with the user from a plurality of payment devices associated with the user based on profile data associated with the plurality of payment devices; automatically generate a second authorization request associated with the transaction, the second authorization request including second account data associated with the second payment device issued to the user; communicate the second authorization request to a second issuer system associated with the second payment device; and in response to determining that the second authorization request was approved by the second issuer, process the transaction based on the transaction data and the second account data.

In some non-limiting embodiments or aspects, the first authorization request may include a card-present authorization request, and the second authorization request may include a card-not-present authorization request. Determining the second payment device may include: querying, with the transaction processing system, an electronic wallet provider system; and receiving, from the electronic wallet provider system, a query response identifying the second payment device. Automatically generating the second authorization request may include generating the second authorization request independent of the user and the merchant system.

According to some non-limiting embodiments or aspects, a computer program product for automatically re-processing a transaction in an electronic payment processing network independent of a merchant system or a user, the electronic payment processing network includes a transaction processing system in communication with at least one issuer system and at least one merchant system, includes at least one non-transitory computer-readable medium including one or more instructions that, when executed by at least one processor of the transaction processing system, cause the at least one processor to: receive a first transaction message associated with a payment transaction between a user and a merchant, the first transaction message including transaction data including first account data associated with a first payment device issued to the user; generate a first authorization request including the first account data; communicate the first authorization request to an issuer system; in response to determining that the first authorization request failed, automatically determine a second payment device associated with the user from a plurality of payment devices associated with the user based on profile data associated with the plurality of payment devices; automatically generate a second authorization request associated with the transaction, the second authorization request including second account data associated with the second payment device issued to the user; communicate the second authorization request to a second issuer system associated with the second payment device; and in response to determining that the second authorization request was approved by the second issuer, process the transaction based on the transaction data and the second account data.

Further non-limiting embodiments or aspects are set forth in the following numbered clauses:

Clause 1: A computer-implemented method for automatically re-processing a transaction in an electronic payment processing network independent of a merchant system or a user, the electronic payment processing network comprising a transaction processing system in communication with at least one issuer system and at least one merchant system, the method comprising: receiving, with the transaction processing system, a first transaction message associated with a payment transaction between a user and a merchant, the first transaction message comprising transaction data including first account data associated with a first payment device issued to the user; generating, with the transaction processing system, a first authorization request comprising the first account data; communicating, with the transaction processing system, the first authorization request to an issuer system; in response to determining that the first authorization request failed, automatically determining, with the transaction processing system, a second payment device associated with the user from a plurality of payment devices associated with the user based on profile data associated with the plurality of payment devices; automatically generating, with the transaction processing system, a second authorization request associated with the transaction, the second authorization request comprising second account data associated with the second payment device issued to the user; communicating, with the transaction processing system, the second authorization request to a second issuer system associated with the second payment device; and in response to determining that the second authorization request was approved by the second issuer, processing, with the transaction processing system, the transaction based on the transaction data and the second account data.

Clause 2: The method of clause 1, wherein the first authorization request comprises a card-present authorization request, and wherein the second authorization request comprises a card-not-present authorization request.

Clause 3: The method of clause 1 or 2, wherein determining the second payment device comprises: querying, with the transaction processing system, an electronic wallet provider system; and receiving, from the electronic wallet provider system, a query response identifying the second payment device.

Clause 4: The method of any of clauses 1-3, wherein the profile data comprises at least one of the following: payment device type associated with each payment device, transaction amount of the transaction, daily spend associated with each payment device, monthly spend associated with each payment device, risk level associated with each payment device, approval ratio associated with each payment device, channels and authentication associated with each payment device, ratio of cross-border to domestic transactions associated with each payment device, or any combination thereof.

Clause 5: The method of any of clauses 1-4, further comprising: in response to receiving the first transaction message, determining, with the transaction processing system, that the user is registered with an automatic re-processing program, wherein the second payment device is automatically determined in response to determining that the user is registered with the automatic re-processing program.

Clause 6: The method of any of clauses 1-5, wherein the plurality of payment devices associated with the user are registered with the user in the automatic re-processing program.

Clause 7: The method of any of clauses 1-6, wherein the first payment device is issued to the user by a first issuer associated with the issuer system, the second payment device is issued to the user by a second issuer associated with the second issuer system, the first authorization request is communicated to the issuer system, and the second authorization request is communicated to the second issuer system.

Clause 8: The method of any of clauses 1-7, wherein the first authorization request comprises a credit card authorization request or a debit card authorization request, and wherein the second authorization request comprises a credit card authorization request if the first authorization request comprises a debit card authorization request or a debit card authorization request if the first authorization request comprises a credit card authorization request.

Clause 9: The method of any of clauses 1-8, further comprising: in response to receiving the second authorization response, communicating, with the transaction processing system, a first transaction response comprising at least a portion of the second account data.

Clause 10: The method of any of clauses 1-9, wherein automatically generating the second authorization request comprises generating the second authorization request independent of the user and the merchant system.

Clause 11: The method of any of clauses 1-10, wherein determining the second payment device comprises querying, with the transaction processing system, an electronic wallet provider system and receiving a query response identifying the second payment device, wherein the second payment device is determined to have a highest likelihood of approval of the plurality of payment devices.

Clause 12: The method of any of clauses 1-11, wherein determining that the first authorization request failed comprises determining that the first authorization request was declined or that no response to the first authorization request was received within a predetermined time period.

Clause 13: The method of any of clauses 1-12, further comprising: in response to determining that the first authorization request failed, automatically determining, with the transaction processing system, the second payment device and a third payment device associated with the user from a plurality of payment devices associated with the user; automatically generating, with the transaction processing system, the second authorization request associated with the transaction, wherein the second authorization request comprises a split authorization request comprising a second retry and a third retry, wherein the second retry comprises second account data associated with the second payment device issued to the user and the third retry comprises third account data associated with the third payment device issued to the user; communicating, with the transaction processing system, the second authorization request to the second issuer system associated with the second payment device and a third issuer system associated with the third payment device; receiving, with the transaction processing system, second authorization responses in response to the second authorization request; determining, with the transaction processing system, that the second authorization request was approved based on the second authorization responses; and in response to determining that the second authorization request was approved, processing, with the transaction processing system, the transaction based on the transaction data, the second account data, and the third account data.

Clause 14: The method of any of clauses 1-13, wherein the split authorization request evenly splits a transaction amount associated with the payment transaction between the second retry and the third retry.

Clause 15: The method of any of clauses 1-14, wherein the third payment device is the same as the first payment device, and wherein the split authorization request unevenly splits a transaction amount associated with the payment transaction between the second retry and the third retry, wherein the third retry comprises an authorization amount associated with a funds balance of the third payment device, and the second retry comprises an authorization amount equal to a difference between the transaction amount and the funds balance of the third payment device.

Clause 16: A system for automatically re-processing a transaction in an electronic payment processing network independent of a merchant system or a user, the electronic payment processing network comprising a transaction processing system in communication with at least one issuer system and at least one merchant system, the system comprising at least one processor of the transaction processing system programmed or configured to: receive a first transaction message associated with a payment transaction between a user and a merchant, the first transaction message comprising transaction data including first account data associated with a first payment device issued to the user; generate a first authorization request comprising the first account data; communicate the first authorization request to an issuer system; in response to determining that the first authorization request failed, automatically determine a second payment device associated with the user from a plurality of payment devices associated with the user based on profile data associated with the plurality of payment devices; automatically generate a second authorization request associated with the transaction, the second authorization request comprising second account data associated with the second payment device issued to the user; communicate the second authorization request to a second issuer system associated with the second payment device; and in response to determining that the second authorization request was approved by the second issuer, process the transaction based on the transaction data and the second account data.

Clause 17: The system of clause 16, wherein the first authorization request comprises a card-present authorization request, and wherein the second authorization request comprises a card-not-present authorization request.

Clause 18: The system of clause 16 or 17, wherein determining the second payment device comprises: querying, with the transaction processing system, an electronic wallet provider system; and receiving, from the electronic wallet provider system, a query response identifying the second payment device.

Clause 19: The system of any of clauses 16-18, wherein the profile data comprises at least one of the following: payment device type associated with each payment device, transaction amount of the transaction, daily spend associated with each payment device, monthly spend associated with each payment device, risk level associated with each payment device, approval ratio associated with each payment device, channels and authentication associated with each payment device, ratio of cross-border to domestic transactions associated with each payment device, or any combination thereof.

Clause 20: The system of any of clauses 16-19, wherein the at least one processor is programmed or configured to: in response to receiving the first transaction message, determine that the user is registered with an automatic re-processing program, wherein the second payment device is automatically determined in response to determining that the user is registered with the automatic re-processing program.

Clause 21: The system of any of clauses 16-20, wherein the plurality of payment devices associated with the user are registered with the user in the automatic re-processing program.

Clause 22: The system of any of clauses 16-21, wherein the first payment device is issued to the user by a first issuer associated with the issuer system, the second payment device is issued to the user by a second issuer associated with the second issuer system, the first authorization request is communicated to the issuer system, and the second authorization request is communicated to the second issuer system.

Clause 23: The system of any of clauses 16-22, wherein the first authorization request comprises a credit card authorization request or a debit card authorization request, and wherein the second authorization request comprises a credit card authorization request if the first authorization request comprises a debit card authorization request or a debit card authorization request if the first authorization request comprises a credit card authorization request.

Clause 24: The system of any of clauses 16-23, wherein the at least one processor is programmed or configured to: in response to receiving the second authorization response, communicate a first transaction response comprising at least a portion of the second account data.

Clause 25: The system of any of clauses 16-24, wherein automatically generating the second authorization request comprises generating the second authorization request independent of the user and the merchant system.

Clause 26: The system of any of clauses 16-25, wherein determining the second payment device comprises querying, with the transaction processing system, an electronic wallet provider system and receiving a query response identifying the second payment device, wherein the second payment device is determined to have a highest likelihood of approval of the plurality of payment devices.

Clause 27: The system of any of clauses 16-26, wherein determining that the first authorization request failed comprises determining that the first authorization request was declined or that no response to the first authorization request was received within a predetermined time period.

Clause 28: The system of any of clauses 16-27, wherein the at least one processor is programmed or configured to: in response to determining that the first authorization request failed, automatically determine the second payment device and a third payment device associated with the user from a plurality of payment devices associated with the user; automatically generate the second authorization request associated with the transaction, wherein the second authorization request comprises a split authorization request comprising a second retry and a third retry, wherein the second retry comprises second account data associated with the second payment device issued to the user and the third retry comprises third account data associated with the third payment device issued to the user; communicate the second authorization request to the second issuer system associated with the second payment device and a third issuer system associated with the third payment device; receive second authorization responses in response to the second authorization request; determine that the second authorization request was approved based on the second authorization responses; and in response to determining that the second authorization request was approved, process the transaction based on the transaction data, the second account data, and the third account data.

Clause 29: The system of any of clauses 16-28, wherein the split authorization request evenly splits a transaction amount associated with the payment transaction between the second retry and the third retry.

Clause 30: The system of any of clauses 16-29, wherein the third payment device is the same as the first payment device, and wherein the split authorization request unevenly splits a transaction amount associated with the payment transaction between the second retry and the third retry, wherein the third retry comprises an authorization amount associated with a funds balance of the third payment device, and the second retry comprises an authorization amount equal to a difference between the transaction amount and the funds balance of the third payment device.

Clause 31: A computer program product for automatically re-processing a transaction in an electronic payment processing network independent of a merchant system or a user, the electronic payment processing network comprising a transaction processing system in communication with at least one issuer system and at least one merchant system, the computer program product comprising at least one non-transitory computer-readable medium including one or more instructions that, when executed by at least one processor of the transaction processing system, cause the at least one processor to: receive a first transaction message associated with a payment transaction between a user and a merchant, the first transaction message comprising transaction data including first account data associated with a first payment device issued to the user; generate a first authorization request comprising the first account data; communicate the first authorization request to an issuer system; in response to determining that the first authorization request failed, automatically determine a second payment device associated with the user from a plurality of payment devices associated with the user based on profile data associated with the plurality of payment devices; automatically generate a second authorization request associated with the transaction, the second authorization request comprising second account data associated with the second payment device issued to the user; communicate the second authorization request to a second issuer system associated with the second payment device; and in response to determining that the second authorization request was approved by the second issuer, process the transaction based on the transaction data and the second account data.

Clause 32: The computer program product of clause 31, wherein the first authorization request comprises a card-present authorization request, and wherein the second authorization request comprises a card-not-present authorization request.

Clause 33: The computer program product of clause 31 or 32, wherein determining the second payment device comprises: querying, with the transaction processing system, an electronic wallet provider system; and receiving, from the electronic wallet provider system, a query response identifying the second payment device.

Clause 34: The computer program product of any of clauses 31-33, wherein the profile data comprises at least one of the following: payment device type associated with each payment device, transaction amount of the transaction, daily spend associated with each payment device, monthly spend associated with each payment device, risk level associated with each payment device, approval ratio associated with each payment device, channels and authentication associated with each payment device, ratio of cross-border to domestic transactions associated with each payment device, or any combination thereof.

Clause 35: The computer program product of any of clauses 31-34, wherein the one or more instructions, when executed by at least one processor of the transaction processing system, cause the at least one processor to: in response to receiving the first transaction message, determine that the user is registered with an automatic re-processing program, wherein the second payment device is automatically determined in response to determining that the user is registered with the automatic re-processing program.

Clause 36: The computer program product of any of clauses 31-35, wherein the plurality of payment devices associated with the user are registered with the user in the automatic re-processing program.

Clause 37: The computer program product of any of clauses 31-36, wherein the first payment device is issued to the user by a first issuer associated with the issuer system, the second payment device is issued to the user by a second issuer associated with the second issuer system, the first authorization request is communicated to the issuer system, and the second authorization request is communicated to the second issuer system.

Clause 38: The computer program product of any of clauses 31-37, wherein the first authorization request comprises a credit card authorization request or a debit card authorization request, and wherein the second authorization request comprises a credit card authorization request if the first authorization request comprises a debit card authorization request or a debit card authorization request if the first authorization request comprises a credit card authorization request.

Clause 39: The computer program product of any of clauses 31-38, wherein the one or more instructions, when executed by at least one processor of the transaction processing system, cause the at least one processor to: in response to receiving the second authorization response, communicate a first transaction response comprising at least a portion of the second account data.

Clause 40: The computer program product of any of clauses 31-39, wherein automatically generating the second authorization request comprises generating the second authorization request independent of the user and the merchant system.

Clause 41: The computer program product of any of clauses 31-40, wherein determining the second payment device comprises querying, with the transaction processing system, an electronic wallet provider system and receiving a query response identifying the second payment device, wherein the second payment device is determined to have a highest likelihood of approval of the plurality of payment devices.

Clause 42: The computer program product of any of clauses 31-41, wherein determining that the first authorization request failed comprises determining that the first authorization request was declined or that no response to the first authorization request was received within a predetermined time period.

Clause 43: The computer program product of any of clauses 31-42, wherein the one or more instructions, when executed by at least one processor of the transaction processing system, cause the at least one processor to: in response to determining that the first authorization request failed, automatically determine the second payment device and a third payment device associated with the user from a plurality of payment devices associated with the user; automatically generate the second authorization request associated with the transaction, wherein the second authorization request comprises a split authorization request comprising a second retry and a third retry, wherein the second retry comprises second account data associated with the second payment device issued to the user and the third retry comprises third account data associated with the third payment device issued to the user; communicate the second authorization request to the second issuer system associated with the second payment device and a third issuer system associated with the third payment device; receive second authorization responses in response to the second authorization request; determine that the second authorization request was approved based on the second authorization responses; and in response to determining that the second authorization request was approved, process the transaction based on the transaction data, the second account data, and the third account data.

Clause 44: The computer program product of any of clauses 31-43, wherein the split authorization request evenly splits a transaction amount associated with the payment transaction between the second retry and the third retry.

Clause 45: The computer program product of any of clauses 31-44, wherein the third payment device is the same as the first payment device, and wherein the split authorization request unevenly splits a transaction amount associated with the payment transaction between the second retry and the third retry, wherein the third retry comprises an authorization amount associated with a funds balance of the third payment device, and the second retry comprises an authorization amount equal to a difference between the transaction amount and the funds balance of the third payment device.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the non-limiting exemplary embodiments that are illustrated in the accompanying schematic figures, in which:

FIG. 2 shows a schematic view of an electronic wallet application according to some non-limiting embodiments or aspects;

DETAILED DESCRIPTION

Figure 1:
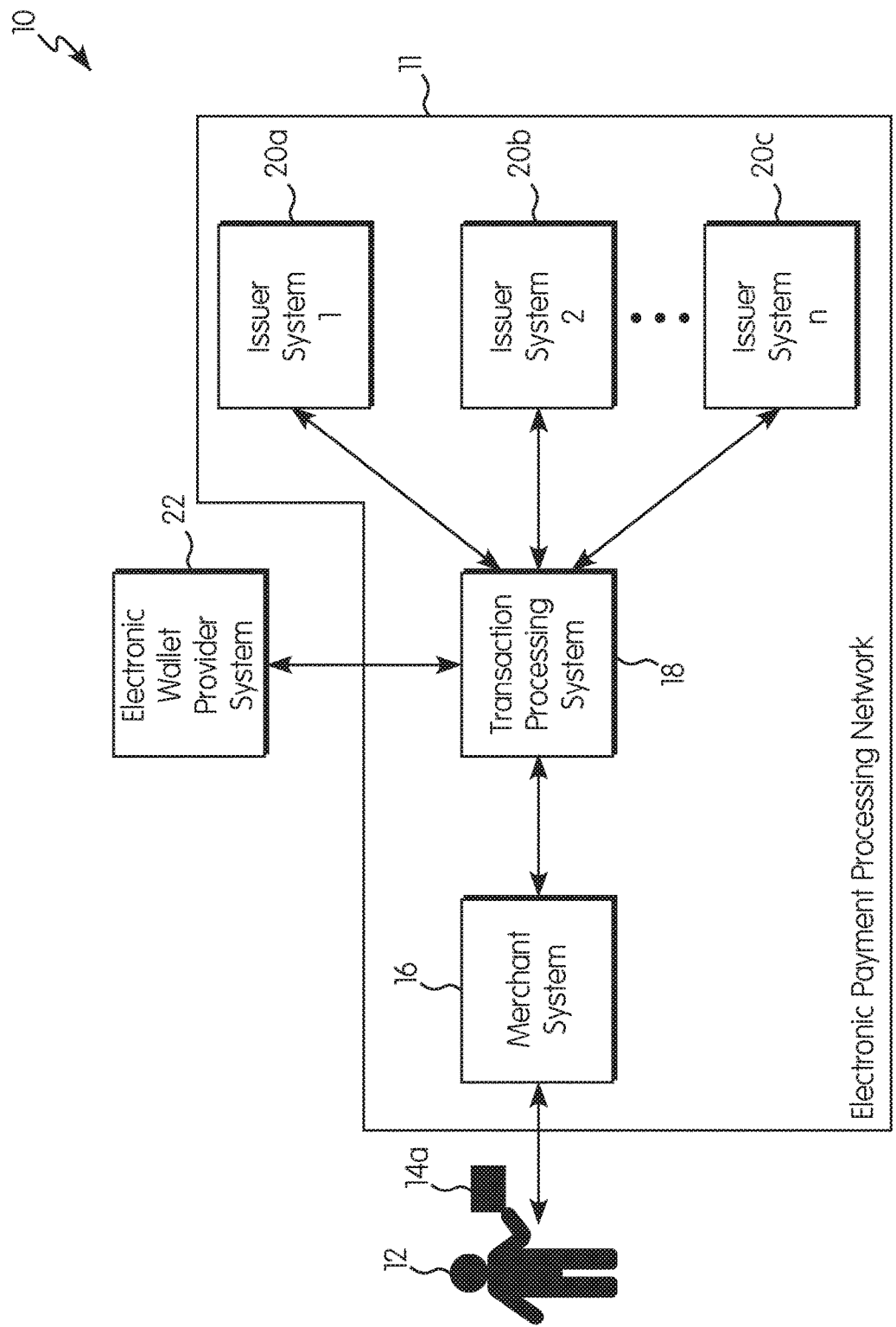
FIG. 1 shows a schematic view of some non-limiting embodiments or aspects of a system for automatically re-processing a transaction in an electronic payment processing network independent of a merchant system or a user.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "card not present transaction" or "CNP transaction" may refer to a payment transaction initiated with a payment device in which the cardholder does not or cannot physically present the payment device for a merchant's visual examination at the time the payment transaction is initiated with the payment device. Non-limiting examples of CNP transactions include mail-order transactions initiated by mail or facsimile or a payment transaction initiated over the telephone or the internet.

As used herein, the term "card present transaction" may refer to a payment transaction initiated with a payment device in which the cardholder physically presents the payment device for a merchant's visual examination at the time the payment transaction is initiated with the payment device. A non-limiting example of a card present transaction is a payment transaction initiated at a brick-and-mortar retail stores with physical POS systems, during with the cardholder physically presents the payment device to the merchant.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "electronic payment processing network" may refer to a plurality of computer systems that communicate with one another in order to process (e.g., authorize, clear, settle) payment transactions. The computer systems may include various merchant systems, each operated by or on behalf of a merchant, transaction processing systems, each operated by or on behalf of a transaction service provider, and issuer systems, each operated by or on behalf of an issuer. In certain cases, the transaction service provider and the issuer may be the same entity.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay™, Apple Pay®, Samsung Pay®, and/or other like electronic payment systems. In some non-limiting examples, an issuer bank or a transaction service provider may be an electronic wallet provider.

As used herein, the term "issuer institution" or "issuer" may refer to one or more entities, such as a bank, that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system.

Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment system such as Visa® or any other entity that processes transactions. The term "transaction processing system" may refer to one or more computer systems operated by or on behalf of a transaction service provider, such as a transaction processing server executing one or more software applications. A transaction processing system may include one or more processors and, in some non-limiting embodiments, may be operated by or on behalf of a transaction service provider.

Non-limiting embodiments or aspects of the present disclosure are directed to a method, system, and computer program product for automatically re-processing a transaction in an electronic payment processing network independent of a merchant system or a user. Non-limiting embodiments or aspects automatically generate a second authorization request upon the first authorization request failing (e.g., being declined or timing out), with the second authorization request being generated using a second payment device different from the first payment device used in the first authorization request. This allows for the system to automatically re-process a failed authorization request without requiring the user or merchant to intervene to specify the second payment device. The user is also not required to have each of the plurality of payment devices present in order to use those payment devices in subsequent authorization requests (after the first authorization request has failed). Non-limiting embodiments or aspects communicate with an electronic wallet provider system to determine the second payment device. The second payment device may be the payment device of the user determined to have the highest probability of being approved, reducing the amount of retry authorization requests that may be required to process the transaction. The second payment device may be determined based on profile data associated with the plurality of payment devices. Non-limiting embodiments or aspects also allow for subsequent authorization requests to be split authorization requests, which may also increase the likelihood of the authorization requests being approved. Non-limiting embodiments or aspects allow for the first authorization request to be communicated as a card-present transaction and the subsequent authorization requests to be communicated as CNP transactions. The system reduces the number of transactions failing to be processed by automatically retrying authorization requests using other payment devices of the user until all payment devices of the user are exhausted.

Referring to FIG. 1, a system 10 for automatically re-processing a transaction in an electronic payment processing network 11 is shown according to some non-limiting embodiments or aspects. The system 10 may include a user 12 (e.g., a consumer) initiating a payment transaction with a merchant system 16 of a merchant using a first payment device 14*a* (e.g., a credit or debit card). The re-processing of the transaction may be performed independent of the user 12 and the merchant system 16 (without requiring intervention of these entities).

With continued reference to FIG. 1, according to some non-limiting embodiments or aspects, upon the user 12 presenting the first payment device 14*a* to the merchant system 16, the merchant system 16 may generate a first transaction message associated with the payment transaction and communicate the first transaction message to a transaction processing system 18 operated by or on behalf of a transaction service provider to initiate processing of the payment transaction. The first transaction message may include transaction data associated with the payment transaction. The transaction data may include certain information required for an authorization decision to be made regarding the payment transaction, such as certain data elements specified by ISO 8583. Non-limiting examples of transaction data may include a transaction amount, goods or services included in the transaction (e.g., UPC codes or other identifier of the goods or services), transaction date, merchant identifier, merchant category code, and the like. The transaction data may further include first account data associated with the first payment device 14*a* used by the user 12 to initiate the transaction. The first account data may include a user name associated with the first account, residential address or other contact information associated with the first account, account identifier (e.g., PAN), expiration date, cvv code, and the like.

The transaction processing system 18 may generate a first authorization request that includes at least a portion of the first account data, according to some non-limiting embodiments or aspects. The first authorization request may be arranged pursuant to ISO 8583. The transaction processing system 18 may communicate the first authorization request to a first issuer system 20*a* operated by or on behalf of the first issuer. The first issuer may be the issuer of the first payment device 14*a* to the user 12. Based on the received first authorization request, the first issuer system 20*a* may determine an authorization decision associated with the payment transaction and communicate that authorization decision to the transaction processing system 18 in a first authorization response. The authorization decision may be to approve the payment transaction, decline the payment transaction, or approve the payment transaction in part (for some amount below the full transaction amount).

With continued reference to FIG. 1, according to some non-limiting embodiments or aspects, the transaction processing system 18 may determine that the first authorization request failed. The first authorization request may be determined to have failed upon the transaction processing system 18 receiving an authorization decision from the first issuer system 20*a* that the payment transaction was declined or approved only in part, such that some or all of the transaction amount still requires approval to complete the transaction. The first authorization request may be determined to have failed upon the transaction processing system 18 not receiving a response to the first authorization request within a predetermined time period. The transaction processing system 18 may not receive a response to the first authorization request within the predetermined time period, for example, in the event of a communication issue between the transaction processing system 18 and the first issuer system 20*a*. The first authorization request may be determined to have failed for any other reason that prevents the payment from being processed using the first payment device 14*a*.

With continued reference to FIGS. 1 and 2, the transaction processing system 18 may automatically determine a second payment device associated with the user 12 from a plurality of payment devices associated with the user 12. The transaction processing system 18 may determine the second payment device based on profile data associated with each of the plurality of payment devices.

According to some non-limiting embodiments or aspects, the transaction processing system 18 may automatically determine the second payment device to automatically re-try authorization of the payment transaction independent of the user 12 and the merchant system 16 upon the user being registered in an automatic re-processing program. The automatic re-processing program may be operated by or on behalf of the transaction service provider, and may be offered to users who wish to have their payment transactions automatically re-processed upon the first authorization response failing. The user 12 may enroll in the automatic re-processing system, which may include registering the plurality of payment devices of the user 12 in the automatic re-processing program.

The transaction processing system 18 may determine that the user is registered in the automatic re-processing program in response to receiving the first transaction message from the merchant system 16. The second payment device may be determined in response to the transaction processing system 18 determining that the user is registered in the automatic re-processing program.

In some non-limiting embodiments or aspects, the transaction processing system 18 may determine the second payment device by analyzing the profile data associated with the plurality of payment devices. In some non-limiting embodiments, the transaction processing system 18 may determine the second payment device by querying an electronic wallet provider system 22. The electronic wallet provider system 22 may be the same system as the transaction processing system 18, or it may be a separate system. The electronic wallet provider system may be operated by or on behalf of the transaction service provider, an issuer, other third party entity, or some combination thereof. The electronic wallet provider system 22 may analyze the profile data associated with the plurality of payment devices to determine the second payment device and communicate a query response indicating the determined second payment device to the transaction processing system 18.

Referring to FIG. 2, an electronic wallet 30 of the electronic wallet provider system 22 is shown according to some non-limiting embodiments or aspects. The electronic wallet 30 may contain data associated with the plurality of payment devices 14*a*-14*d* of the user 12. The electronic wallet 30 may include an account identifier 34 (e.g., the PAN) associated with each of the plurality of payment devices 14*a*-14*d*. The electronic wallet 30 may also include an authorization probability 36, as determined by the electronic wallet provider system 22, for each of the plurality of payment devices. The authorization probability 36 may determine the likelihood that each payment device 14*a*-14*d* would be approved by the issuer for the particular payment transaction being processed. In some non-limiting examples, the authorization probability 36 may include a percentage chance that the payment device would be approved for the payment transaction. In some examples, the authorization probability 36 may include a ranking relative to the other payment devices of the plurality of payment devices, which reflects the order in which the payment devices are most likely to be approved. Thus, in the example shown in FIG. 2, the authorization probability 36 for Card 1 14*b* may be a 99.5% chance that using Card 1 would be approved by the corresponding issuer system for the payment transaction, or the authorization probability 36 for Card 1 14*b* may reflect that Card 1 14*b* has the second highest probability of being approved, behind only Card 2 14*c*.

In some non-limiting embodiments or aspects, the transaction processing system 18 and/or the electronic wallet provider system 22 may determine a second payment device and a third payment device, such that a split authorization may be automatically generated to process the payment transaction after the first authorization request fails using both the second payment device and the third payment device.

According to some non-limiting embodiment or aspects, the determination of the second payment device and/or the authorization probability 36, may be based on the profile data for each of the plurality of payment devices. The profile data may include at least one of the following: payment device type associated with each payment device (e.g., credit or debit card), transaction amount of the transaction, daily spend associated with each payment device, monthly spend associated with each payment device, risk level associated with each payment device, approval ratio associated with each payment device, channels and authentication associated with each payment device, ratio of cross-border to domestic transactions associated with each payment device, or any combination thereof.

According to some non-limiting embodiments or aspects, the determination of the second payment device may be customizable or left to user preference. The user may indicate an order in which the payment devices are to be tried upon determining that the first authorization request failed. The user may provide specific rules that determine the second payment device to be tried upon determining that the first authorization request failed based on characteristics associated with the payment transaction, such as transaction amount, merchant category code associated with the payment transaction, date of the payment transaction, and the like.

According to some non-limiting embodiments or aspects, the determination of the second payment device may be rules-based, such that the rules determine the second payment device to be tried upon determining that the first authorization request failed. For example, the rules may determine that credit cards of the user are to be tried before debit cards (or vice versa) as the second payment device. The rules may prioritize certain payment devices over others based on an entity related to the merchant, the acquirer, or the issuer (e.g., prioritizing a card issued by an issuer based on the acquirer associated with the transaction being affiliated with the issuer, or the merchant having a co-branded payment device issued to the user). The rules may prioritize payment devices associated with certain transaction service providers. It will be appreciated that these represent certain exemplary rules for determining the second payment device, and other rules fall within the scope of this disclosure.

Referring back to FIG. 1, upon determining the second payment device, the transaction processing system 18 may automatically generate a second authorization request associated with the payment transaction, according to some non-limiting embodiments or aspects. The second authorization request may include second account data associated with the second payment device issued to the user. This second authorization request may be generated independent of the merchant system 16 and the user 12, such that no intervention is required by the merchant system 16 or the user 12 to re-process the failed first authorization request. In some non-limiting embodiments or aspects, the user 12 and/or the merchant system 16 may not be notified that the payment transaction was processed with a payment device other than the first payment device 14*a* until a first transaction response notifying the merchant system 16 of the successfully processed transaction is communicated.

The generated second authorization request may be different than the previously-generated first authorization request, as the second authorization request may include the second account data of the second payment device, as opposed to the first account data of the first payment device 14*a*. The second authorization request may be different from the first authorization request in other ways as well. In some non-limiting embodiments or aspects, the first authorization request may be generated by the transaction processing system 18 as a card-present authorization request (because the user 12 may physically present the first payment device 14*a*), while the second authorization request generated by the transaction processing system 18 as a CNP authorization request. This second authorization request may include different data elements or entries as data elements from ISO 8583 compared to the first authorization request based on the second authorization request being a CNP authorization request.

Moreover, in some non-limiting embodiments or aspects, the first authorization request may include a credit or debit card authorization request, while the second authorization request includes the other of the credit or debit card authorization request. As a non-limiting example, the first payment device 14*a* may be a credit card, with the first authorization request being a credit authorization request, while the second payment device is a debit card, with the second authorization request being a debit authorization request (or vice versa).

With continued reference to FIG. 1, according to some non-limiting embodiments or aspects, the transaction processing system 18 may communicate the second authorization request including the second account data to a second issuer system 20*b* operated by or on behalf of a second issuer associated with the second payment device. The second issuer may be the issuer of the second payment device to the user 12. The second issuer (and the second issuer system 20*b* thereof) may be the same issuer as the first issuer (and the first issuer system 20*a* thereof) if the first payment device 14*a* and the second payment device were issued to the user 12 by the same issuer. In some non-limiting embodiments or aspects, the second issuer (and the second issuer system 20*b* thereof) may be different from the first issuer (and the first issuer system 20*a* thereof) if the first payment device 14*a* and the second payment device were issued to the user 12 by different issuers. Thus, the first authorization request may be communicated to the first issuer system 20*a*, while the second authorization request may be communicated to the second (same or different) issuer system 20*b*, depending on whether the issuer of the first payment device 14*a* and the second payment device are the same or different.

With continued reference to FIG. 1, in some non-limiting embodiments or aspects, based on the received second authorization request, the second issuer system 20*b* may determine an authorization decision associated with the payment transaction and communicate that authorization decision to the transaction processing system 18 in a second authorization response. The authorization decision may be to approve the payment transaction, decline the payment transaction, or approve the payment transaction in part (for some amount below the full transaction amount).

In some non-limiting embodiments or aspects, upon receiving the second authorization decision, the transaction processing system 18 may determine that the second authorization request was approved (in full or in part) by the second issuer system 20b based on the received second authorization response. In response to determining that the second authorization request was approved, the transaction processing system 18 may process the transaction based on the transaction data and the second account data associated with the second payment device. Processing the transaction may include completing processing of the payment transaction (e.g., clearing and settling the transaction). Processing the transaction may include communicating, with the transaction processing system 18 a first transaction response to the merchant system 16, notifying the merchant system 16 that the payment transaction has been approved. The first transaction response may include at least a portion of the second account data to notify the merchant system 16 and the user 12 that the payment transaction was processed using a payment device other than the first payment device 14a.

As previously discussed, in some non-limiting embodiments or aspects, the transaction processing system 18 and/or the electronic wallet provider system 22 may determine a second payment device and a third payment device, such that a split authorization may be automatically generated to process the payment transaction after the first authorization request fails. In this non-limiting example, the second authorization request generated by the transaction processing system 18 may include a split authorization request. The split authorization request may include a second retry and a third retry. The second retry may include the second account data associated with the second payment device, and the third retry may include third account data associated with the third payment device. At least one of the second and third payment device may be different from the first payment device 14a. The other of the second and third payment device may be the same (such that the same payment device (the first payment device) is tried again but for a lower transaction amount) or different from the first payment device 14a. For example, the second and third payment devices may be the two payment devices with the highest authorization probability 36 (e.g., Cards 1 and 2 from FIG. 2). For example, the second or third payment device may be the first payment device for an amount less than the full transaction amount and the other of the second or third payment device may be for the remainder of the transaction amount.

In the non-limiting example in which the second authorization request includes a split authorization request with a second retry and third retry, the transaction processing system 18 may simultaneously or near-simultaneously communicate the second authorization request to the second issuer system 20b associated with the second payment device and a third issuer system 20c associated with the third payment device. The third issuer system 20c may be the same or different from the first and second issuer systems 20a-20b, depending on the issuer of each payment device. The second and third issuer systems 20b-20c may determine authorization decisions associated with the payment transaction and communicate those authorization decisions to the transaction processing system 18 in second authorization responses. The authorization decisions may be to approve the payment transaction, decline the payment transaction, or approve the payment transaction in part (for some amount below the full transaction amount).

The split authorization request may evenly split a transaction amount associated with the payment transaction between the second retry and the third retry, such that half of the transaction amount is associated with the second payment device and half of the transaction amount is associated with the third payment device. Thus, the second retry may request authorization of half of the transaction amount from the second payment device and the third retry may request authorization of half of the transaction amount form the third payment device. This may increase the probability of the transaction being approved by at least one of the second and third payment devices.

The split authorization request may unevenly split a transaction amount associated with the payment transaction between the second retry and the third retry such that a first authorization amount (a portion of the transaction amount) is associated with the second payment device and a second authorization amount (a portion of the transaction amount) different from the first authorization amount is associated with the third payment device. The first authorization amount and the second authorization amount may sum to the transaction amount associated with the payment transaction. In some non-limiting examples, the first authorization amount is equal to a funds balance of the second payment device, such as a credit limit of a credit card or an amount of the credit limit left for that credit card. The second authorization amount may be equal to a difference between the first authorization amount and the transaction amount. In this way, the balance of the second payment device may be used, and any additional amount may be covered by the third payment device, reducing the risk of the split authorization request being declined. Any other division of the transaction amount between the second payment device and the third payment device may also be used by the transaction processing system 18.

In response to receiving the second authorization responses from the second issuer system 20b and the third issuer system 20c, the transaction processing system 18 may determine that the second authorization requests were approved based on the received second authorization responses. In response to determining that the second authorization requests were approved, the transaction processing system 18 may process the transaction based on the transaction data, the second account data, and the third account data.

Although the split authorization request scenario described above discusses a split authorization between two payment devices (the second and third payment devices), it will be appreciated that split authorization request may be between any number of payment devices of the user.

Figure 3:
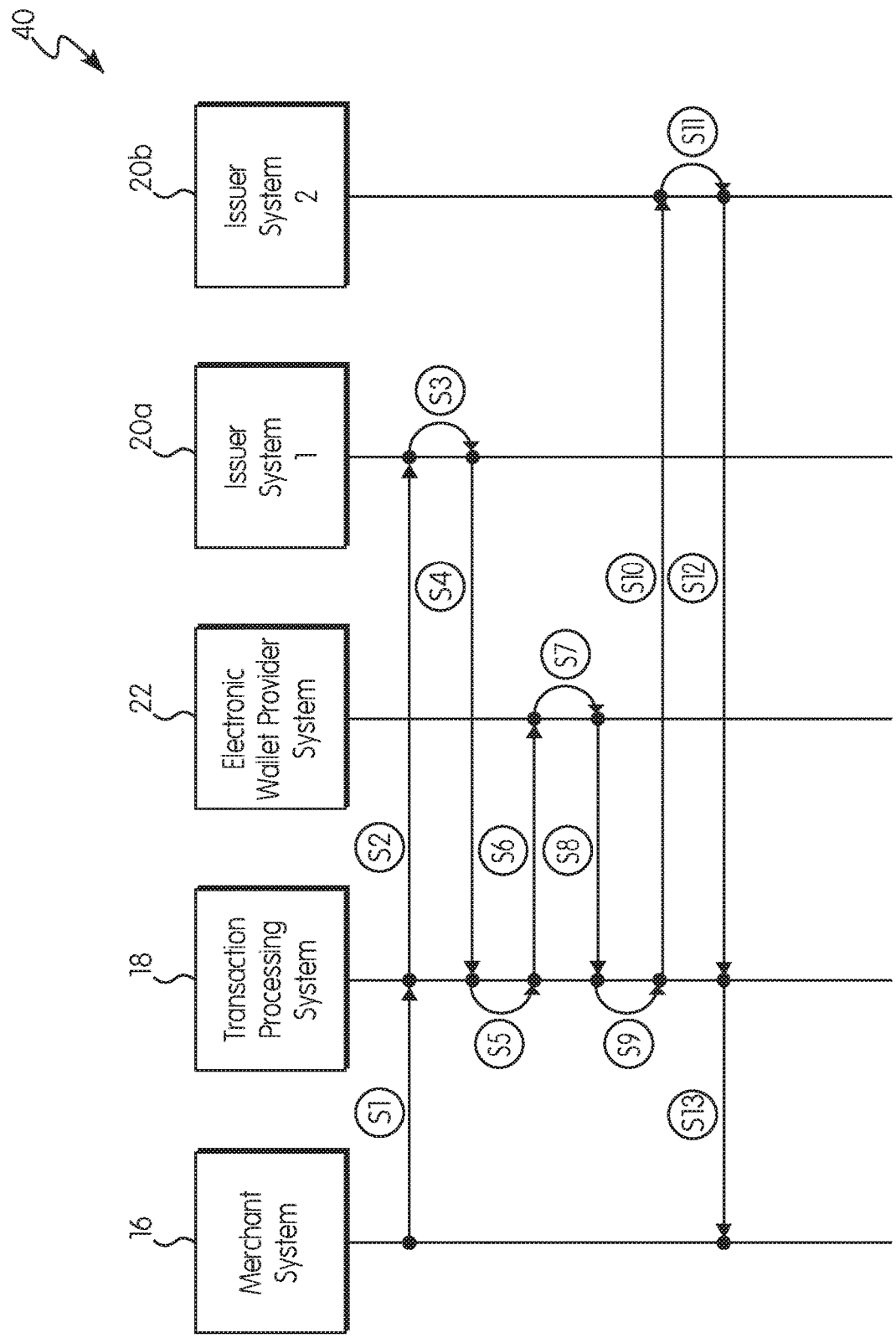
FIG. 3 shows a process flow diagram of some non-limiting embodiments or aspects of a method for automatically re-processing a transaction in an electronic payment processing network independent of a merchant system or a user.

Referring to FIG. 3, a method 40 for automatically re-processing a transaction in an electronic payment processing network independent of a merchant system or a user is shown. At a first step S1, the merchant system 16 may communicate the first transaction message including the transaction data associated with the transaction (including the first account data associated with the first payment device 14a (see FIG. 1)) to the transaction processing system 18. At a second step S2, the transaction processing system 18 may generate a first authorization request including the first account data and may communicate the first authorization request to the first issuer system 20a. The first issuer system 20a is operated by or on behalf of the first issuer, which is the issuer of the first payment device 14a. At a third step S3, the first issuer system 20a may determine the authorization decision associated with the transaction, the first authorization decision being to decline the transaction (at least in part). At a fourth step S4, the first issuer system 20a may communicate the authorization decision to the transaction processing system 18 via the first authorization response.

With continued reference to FIG. 3, in some non-limiting embodiments or aspects, at a fifth step S5, the transaction processing system 18 may determine that the first authorization request failed (at least in part) based on the received first authorization response. In response to determining that the first authorization request failed, at a sixth step S6, the transaction processing system 18 may determine a second payment device associated with the user based on profile data associated with the plurality of payment devices of the user 12. This may include the transaction processing system 18 communicating a query to the electronic wallet provider system 22, which may be the same system or separate from the transaction processing system 18. At a seventh step S7, the electronic wallet provider system 22 may determine the second payment device associated with the user based on profile data. At an eighth step S8, the electronic wallet provider system 22 may communicate the query response to the transaction processing system 18 identifying the second payment device.

With continued reference to FIG. 3, in some non-limiting embodiments or aspects, at a ninth step S9, the transaction processing system 18 may automatically generate the second authorization request associated with the transaction, the second authorization request including the second account data associated with the second payment device. At a tenth step S10, the transaction processing system 18 may communicate the second authorization request to the second issuer system 20b. The second issuer system 20b is operated by or on behalf of the second issuer, which is the issuer of the second payment device. At an eleventh step S11, the second issuer system 20b may determine the second authorization decision associated with the transaction, the second authorization decision being to approve the transaction (at least in part). At a twelfth step S12, the second issuer system 20b may communicate the second authorization decision to the transaction processing system 18 via the second authorization response. At a thirteenth step S13, the transaction processing system 18 may determine that the second authorization request was approved based on the received second authorization response. The transaction processing system 18 may communicate the first transaction response to the merchant system 16 including at least a portion of the second account data to notify the merchant system 16 that the transaction has been approved using the second payment device.

Figure 4:
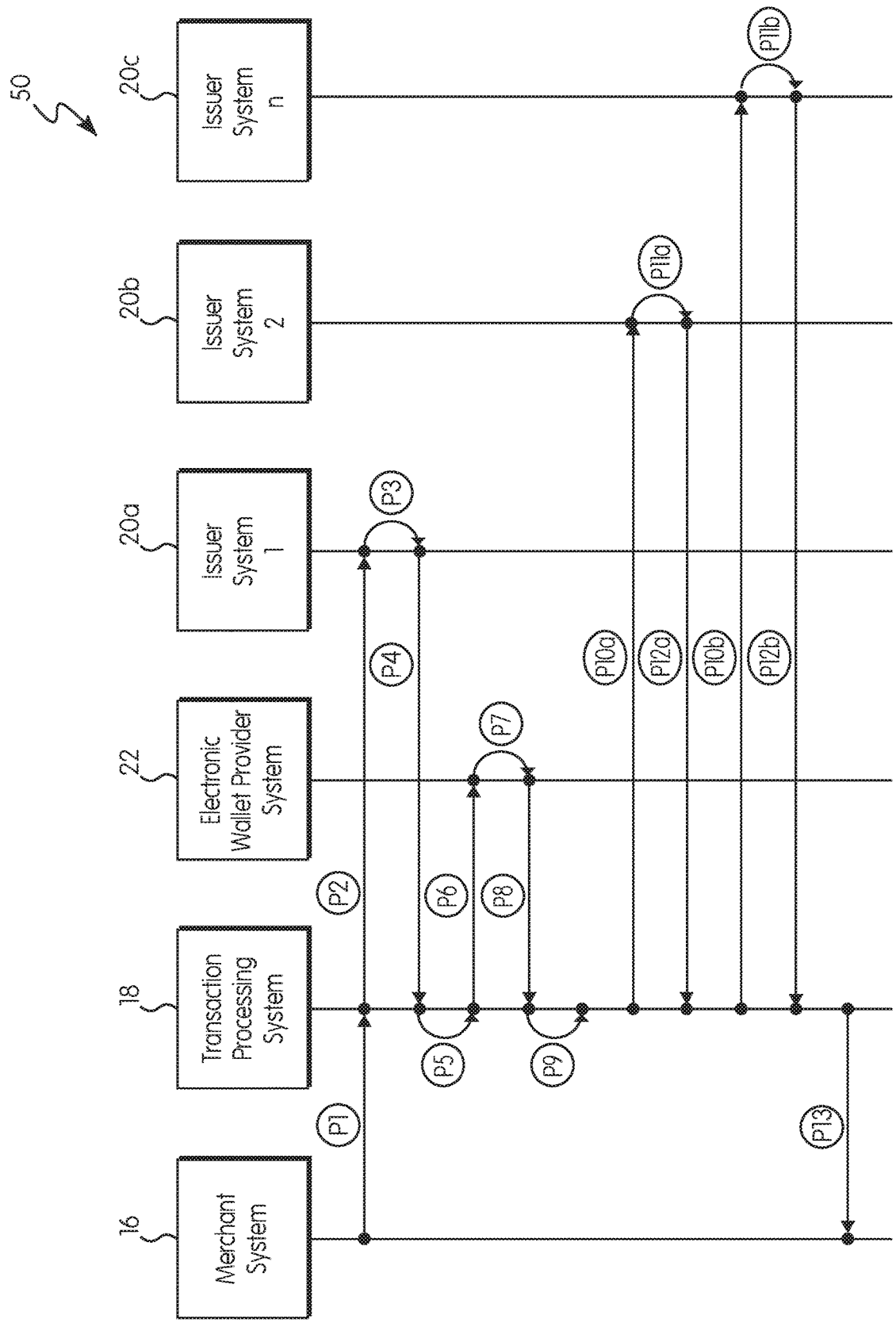
FIG. 4 shows a process flow diagram of some non-limiting embodiments or aspects of a method for automatically re-processing a transaction in an electronic payment processing network independent of a merchant system or a user.

Referring to FIG. 4 a non-limiting split authorization method 50 for automatically re-processing a transaction in an electronic payment processing network independent of a merchant system or a user is shown that is similar to the method 40 shown in FIG. 3 except a split authorization request as the second authorization request is used. Steps P1-P5 in the split authorization method 50 shown in FIG. 4 may be identical to steps S1-S5 from the method 40 shown in FIG. 3.

With continued reference to FIG. 4, in some non-limiting embodiments or aspects, steps P6-P8 may be identical to steps S6-S8 except in the following ways. In the method 40 associated with FIG. 3, the transaction processing system 18 and/or the electronic wallet provider system 22 determine a single payment device (the second payment device) for the second authorization request. In steps P6-P8 of the split authorization method 50 from FIG. 4, the transaction processing system 18 and/or the electronic wallet provider system 22 determine a plurality of payment devices (the second payment device and the third payment device) to include in the second authorization request, which is a split authorization request, such that at least a portion of the transaction amount is covered by the second payment device (the first authorization amount) and at least a portion of the transaction amount is covered by the third payment device (the second authorization amount). At a ninth step P9, the transaction processing system 18 may automatically generate the second authorization request associated with the transaction, the second authorization request as the split authorization request including the second account data associated with the second payment device and the third account data associated with the third payment device.

With continued reference to FIG. 4, in some non-limiting embodiments or aspects, at a tenth step P10a-P10b, the transaction processing system 18 may communicate the second authorization request to the second issuer system 20b and the third issuer system 20c, respectively. For P10a, the second authorization request may include the second retry, which may be the portion of the second, split authorization request communicated to the second issuer system 20b for the first authorization amount. For P10b, the second authorization request may include the third retry, which may be the portion of the second, split authorization request communicated to the third issuer system 20c for the second authorization amount. The second and third retry may be simultaneously or near-simultaneously communicated from the transaction processing system 18 to the second issuer system 20b and third issuer system 20c, respectively.

With continued reference to FIG. 4, in some non-limiting embodiments or aspects, at an eleventh step P11a-P11b, the second issuer system 20b and third issuer system 20c may determine the second authorization decisions associated with the transaction, the second authorization decisions being to approve the transaction (at least in part). For P11a, the second issuer system 20b determines the second authorization decision for the second retry for the first authorization amount is to approve (at least in part) the transaction for the first authorization amount. For P11b, the third issuer system 20c determines the second authorization decision for the third retry for the second authorization amount is to approve (at least in part) the transaction for the second authorization amount. The second authorization decisions may be simultaneously or near-simultaneously determined by the second issuer system 20b and third issuer system 20c.

With continued reference to FIG. 4, in some non-limiting embodiments or aspects, at an twelfth step P12a-P12b, the second issuer system 20b and the third issuer system 20c may each communicate the second authorization decisions to the transaction processing system 18 via second authorization responses. At a thirteenth step P13, the transaction processing system 18 may determine that the second authorization request was approved based on the received second authorization responses from the second and third issuer systems 20b-20c. The transaction processing system 18 may communicate the first transaction response to the merchant system 16 including at least a portion of the second account data and the third account data to notify the merchant system 16 that the transaction has been approved using the second payment device and the third payment device.

Figure 5:
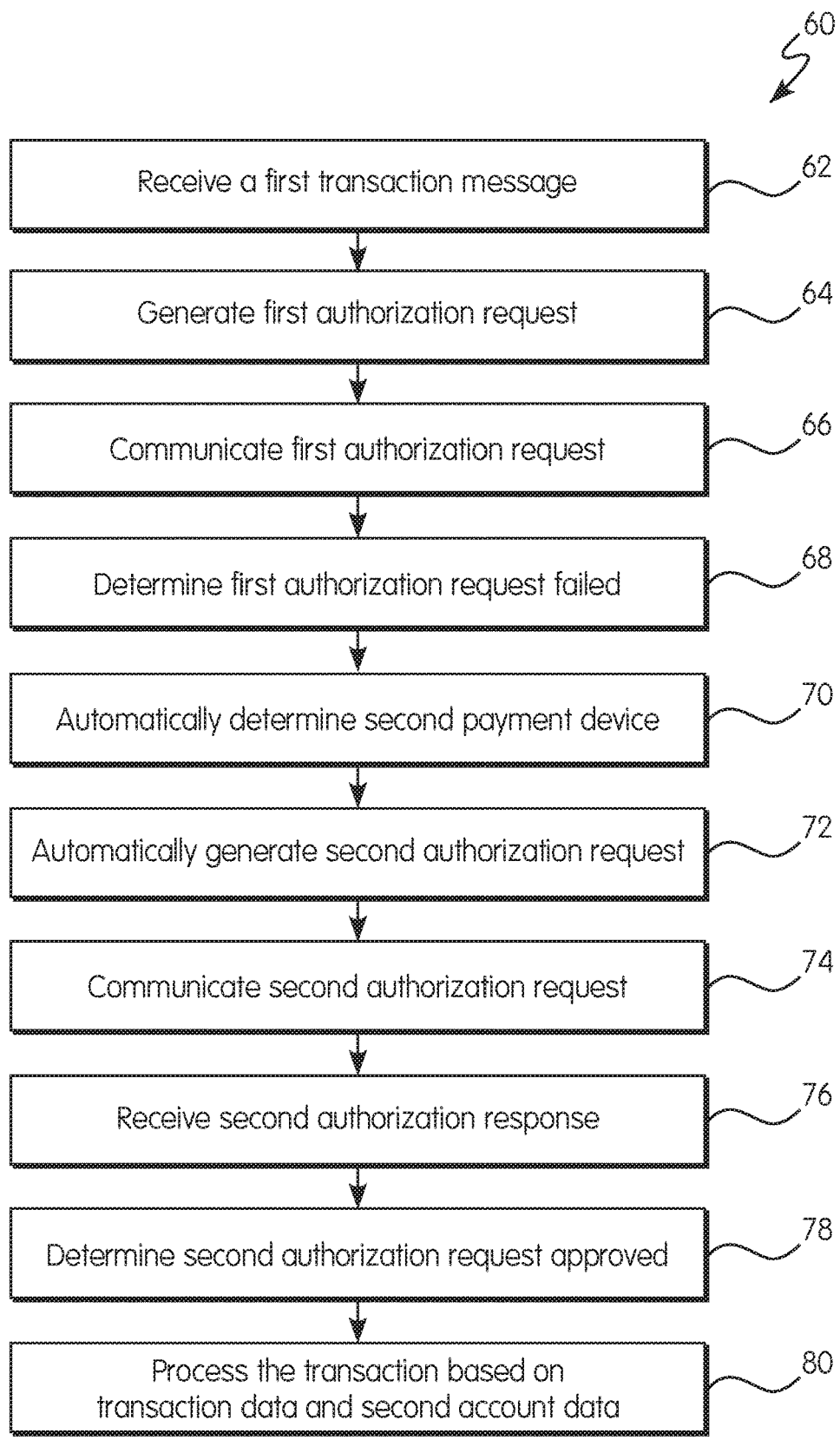
FIG. 5 shows a step diagram of some non-limiting embodiments or aspects of a method for automatically re-processing a transaction in an electronic payment processing network independent of a merchant system or a user.

Referring to FIG. 5, a method 60 for automatically re-processing a transaction in an electronic payment processing network independent of a merchant system or a user is shown. The electronic payment processing network 11 (see FIG. 1) may include the transaction processing system 18 (see FIGS. 1, 3 and 4) in communication with the issuer systems 20a-20c (see FIGS. 1, 3 and 4) and the merchant system 16 (see FIGS. 1, 3 and 4). At a first step 62, the transaction processing system 18 may receive the first transaction message associated with a payment transaction between the user 12 and the merchant. The first transaction message may include the transaction data including the first account data associated with the first payment device 14*a* (see FIG. 1) issued to the user 12 (see FIG. 1). At a second step 64, the transaction processing system 18 may generate the first authorization request including the first account data. At a third step 66, the transaction processing system 18 may communicate the first authorization request to the first issuer system 20*a*.

With continued reference to FIG. 5, at a fourth step 68, the transaction processing system 18 (see FIGS. 1, 3 and 4) may determine that the first authorization request failed. At a fifth step 70, in response to determining that the first authorization request failed, the transaction processing system 18 may automatically determine the second payment device associated with the user 12 (see FIG. 1) from the plurality of payment devices associated with the user 12 based on the profile data associated with the plurality of payment devices. At a sixth step 72, the transaction processing system 18 may automatically generate the second authorization request associated with the transaction, the second authorization request including the second account data associated with the second payment device issued to the user 12. At a seventh step 74, the transaction processing system 18 may communicate the second authorization request to the second issuer system 20*b* (see FIGS. 1, 3 and 4) associated with the second payment device. At an eighth step 76, the transaction processing system 18 may receive the second authorization response from the second issuer system 20*b* in response to the second authorization request. At a ninth step 78, the transaction processing system 18 may determine that the second authorization request was approved by the second issuer system 20*b* based on the second authorization response. At a tenth step 80, in response to determining that the second authorization request was approved, the transaction processing system 18 may process the transaction based on the transaction data and the second account data.

In some non-limiting embodiments or aspects, a computer program product for automatically re-processing a transaction in an electronic payment processing network independent of a merchant system or a user includes at least one non-transitory computer readable medium including program instructions that, when executed by at least one processor, cause the at least one processor to execute one of the previously-described systems and/or methods. The at least one processor may include the transaction processing system 18 (see FIGS. 1, 3 and 4) and/or the electronic wallet provider system 22 (see FIGS. 1, 3 and 4).

In some non-limiting embodiments or aspects, the transaction processing system 18 may automatically determine a second payment device associated with the user 12 from a plurality of payment devices associated with the user 12 without the first authorization request having first failed. The transaction processing system 18 may determine the second payment device in response to receiving the first transaction message. The transaction processing system 18 may determine the second payment device in the same manner as previously described. However, instead of generating and communicating the first authorization request including the first payment device, the transaction processing system 18 may generate and communicate the first authorization request including the second payment device. In this way, the transaction processing system 18 may generate and communicate an authorization request using the payment device (in this case the second payment device) determined to be the most likely to be approved before any authorization request has failed. The first authorization request in these non-limiting embodiments may be a split authorization request similar to the split authorization request previously described.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for automatically re-processing a transaction in an electronic payment processing network independent of a merchant system or a user, the electronic payment processing network comprising a transaction processing system in communication with at least one issuer system and at least one merchant system, the method comprising:

receiving, with the transaction processing system, a first transaction message associated with a payment transaction between the user and a merchant, the first transaction message comprising transaction data including first account data associated with a first payment device issued to the user;

generating, with the transaction processing system, a first authorization request comprising the first account data, wherein the first authorization request comprises a card-present authorization request, the first authorization request comprising a first plurality of data elements associated with a card-present transaction, wherein the first account data populates the first plurality of data elements;

communicating, with the transaction processing system, the first authorization request to an issuer system;

determining, with the transaction processing system, that the first authorization request failed;

in response to determining that the first authorization request failed, automatically determining, with the transaction processing system, a second payment device and a third payment device associated with the user from a plurality of payment devices associated with the user based on profile data associated with the plurality of payment devices, wherein the second payment device and the third payment device are automatically determined without communicating with the merchant system or the user, wherein determining the second payment device and the third payment device comprises querying, with the transaction processing system, an electronic wallet provider system, and receiving, from the electronic wallet provider system, a query response identifying the second and third payment devices;

converting the first authorization request from a card-present authorization request to a second authorization request comprising a card-not-present authorization request and a third authorization request by automatically generating, with the transaction processing system, the second authorization request and the third authorization request associated with the transaction, wherein the second and third authorization requests form a split authorization request comprising a second retry and a third retry, wherein the second retry comprises second account data associated with the second payment device issued to the user and the third retry comprises third account data associated with the third payment device issued to the user, wherein the second and third authorization requests are automatically generated without communicating with the merchant system or the user, wherein the second authorization request comprises a second plurality of data elements associated with a card-not-present transaction, wherein the second account data populates the second plurality of data elements, wherein the second authorization request corresponding to the card-not-present transaction comprises at least one different data element or different entry as a data element compared to the first authorization request corresponding to the card-present transaction;

communicating, with the transaction processing system, the second and third authorization requests to a second issuer system associated with the second payment device and a third issuer system associated with the third payment device, respectively;

receiving, with the transaction processing system, second and third authorization responses from the second and third issuer systems and determining, based on the second and third authorization responses, that the second and third authorization requests were approved; and in response to determining that the second and third authorization requests were approved by the second and third issuer systems, processing, with the transaction processing system, the transaction based on the transaction data and the second and third account data.

2. The method of claim 1, wherein the profile data comprises at least one of the following: payment device type associated with each payment device, transaction amount of the transaction, daily spend associated with each payment device, monthly spend associated with each payment device, risk level associated with each payment device, approval ratio associated with each payment device, channels and authentication associated with each payment device, ratio of cross-border to domestic transactions associated with each payment device, or any combination thereof.

3. The method of claim 1, further comprising:
in response to receiving the first transaction message, determining, with the transaction processing system, that the user is registered with an automatic re-processing program, wherein the second and third payment devices are automatically determined in response to determining that the user is registered with the automatic re-processing program.

4. The method of claim 3, wherein the plurality of payment devices associated with the user are registered with the user in the automatic re-processing program.

5. The method of claim 1, wherein the first payment device is issued to the user by a first issuer associated with the issuer system, the second payment device is issued to the user by a second issuer associated with the second issuer system, the first authorization request is communicated to the issuer system, and the second authorization request is communicated to the second issuer system.

6. The method of claim 1, wherein the first authorization request comprises a credit card authorization request or a debit card authorization request, and wherein the second authorization request comprises a credit card authorization request if the first authorization request comprises a debit card authorization request or a debit card authorization request if the first authorization request comprises a credit card authorization request.

7. The method of claim 1, further comprising:
in response to receiving the second authorization response, communicating, with the transaction processing system, a first transaction response comprising at least a portion of the second account data.

8. The method of claim 1, wherein determining the second payment device comprises querying, with the transaction processing system, the electronic wallet provider system and receiving a query response identifying the second payment device, wherein the second payment device is determined to have a highest likelihood of approval of the plurality of payment devices.

9. The method of claim 1, wherein determining that the first authorization request failed comprises determining that the first authorization request was declined or that no response to the first authorization request was received within a predetermined time period.

10. The method of claim 1, wherein the split authorization request evenly splits a transaction amount associated with the payment transaction between the second retry and the third retry.

11. The method of claim 1, wherein the third payment device is the same as the first payment device, and wherein the split authorization request unevenly splits a transaction amount associated with the payment transaction between the second retry and the third retry, wherein the third retry comprises an authorization amount associated with a funds balance of the third payment device, and the second retry comprises an authorization amount equal to a difference between the transaction amount and the funds balance of the third payment device.

12. A system for automatically re-processing a transaction in an electronic payment processing network independent of a merchant system or a user, the electronic payment processing network comprising a transaction processing system in communication with at least one issuer system and at least one merchant system, the system comprising at least one processor of the transaction processing system programmed or configured to:
receive a first transaction message associated with a payment transaction between the user and a merchant, the first transaction message comprising transaction data including first account data associated with a first payment device issued to the user;
generate a first authorization request comprising the first account data, wherein the first authorization request comprises a credit card authorization request or a debit card authorization request, the first authorization request comprising a first plurality of data elements associated with a credit or debit transaction, wherein the first account data populates the first plurality of data elements;
communicate the first authorization request to an issuer system;
determine that the first authorization request failed;
in response to determining that the first authorization request failed, automatically determine a second payment device and a third payment device associated with the user from a plurality of payment devices associated with the user based on profile data associated with the plurality of payment devices, wherein the second payment device and the third payment device are automatically determined without communicating with the merchant system or the user, wherein determining the second payment device and the third payment device comprises querying, with the transaction processing system, an electronic wallet provider system, and receiving, from the electronic wallet provider system, a query response identifying the second and third payment devices;

convert the first authorization request from the credit card authorization request or the debit card authorization request to a second authorization request comprising the other of the credit card authorization request or the debit card authorization request and a third authorization request by automatically generating the second authorization request and the third authorization request associated with the transaction, wherein the second and third authorization requests form a split authorization request comprising a second retry and a third retry, wherein the second retry comprises second account data associated with the second payment device issued to the user and the third retry comprises third account data associated with the third payment device issued to the user, wherein the second and third authorization requests are automatically generated without communicating with the merchant system or the user, wherein the second authorization request comprises a second plurality of data elements associated with the other of the credit card authorization request or the debit card authorization request, wherein the second account data populates the second plurality of data elements, wherein the second authorization request corresponding to the other of the credit card authorization request or the debit card authorization request comprises at least one different data element or different entry as a data element compared to the first authorization request corresponding to the credit card authorization request or the debit card authorization request;

communicate the second and third authorization requests to a second issuer system associated with the second payment device and a third issuer system associated with the third payment device, respectively;

receive second and third authorization responses from the second and third issuer systems and determine, based on the second and third authorization responses, that the second and third authorization requests were approved; and in response to determining that the second and third authorization requests were approved by the second and third issuer systems, process the transaction based on the transaction data and the second and third account data.

13. The system of claim 12, wherein the first authorization request comprises a card-present authorization request, and wherein the second authorization request comprises a card-not-present authorization request.

14. A computer program product for automatically re-processing a transaction in an electronic payment processing network independent of a merchant system or a user, the electronic payment processing network comprising a transaction processing system in communication with at least one issuer system and at least one merchant system, the computer program product comprising at least one non-transitory computer-readable medium including one or more instructions that, when executed by at least one processor of the transaction processing system, cause the at least one processor to:

receive a first transaction message associated with a payment transaction between the user and a merchant, the first transaction message comprising transaction data including first account data associated with a first payment device issued to the user;

generate a first authorization request comprising the first account data, wherein the first authorization request comprises a card-present authorization request, the first authorization request comprising a first plurality of data elements associated with a card-present transaction, wherein the first account data populates the first plurality of data elements;

communicate the first authorization request to an issuer system;

determine that the first authorization request failed;

in response to determining that the first authorization request failed, automatically determine a second payment device and a third payment device associated with the user from a plurality of payment devices associated with the user based on profile data associated with the plurality of payment devices, wherein the second payment device and the third payment device are automatically determined without communicating with the merchant system or the user, wherein determining the second payment device and the third payment device comprises querying, with the transaction processing system, an electronic wallet provider system, and receiving, from the electronic wallet provider system, a query response identifying the second and third payment devices;

convert the first authorization request from a card-present authorization request to a second authorization request comprising a card-not-present authorization request and a third authorization request by automatically generating the second authorization request and the third authorization request associated with the transaction, wherein the second and third authorization requests form a split authorization request comprising a second retry and a third retry, wherein the second retry comprises second account data associated with the second payment device issued to the user and the third retry comprises third account data associated with the third payment device issued to the user, wherein the second and third authorization requests are automatically generated without communicating with the merchant system or the user, wherein the second authorization request comprises a second plurality of data elements associated with a card-not-present transaction, wherein the second account data populates the second plurality of data elements, wherein the second authorization request corresponding to the card-not-present transaction comprises at least one different data element or different entry as a data element compared to the first authorization request corresponding to the card-present transaction;

communicate the second and third authorization requests to a second issuer system associated with the second payment device and a third issuer system associated with the third payment device, respectively;

receive second and third authorization responses from the second and third issuer systems and determine, based on the second and third authorization responses, that the second and third authorization requests were approved; and in response to determining that the second and third authorization requests were approved by the second and third issuer systems, process the transaction based on the transaction data and the second and third account data.

* * * * *